E. J. CANFIELD AND M. MORRILL.
ANTISKIDDING DEVICE.
APPLICATION FILED JAN. 2, 1919.
1,333,831.
Patented Mar. 16, 1920.
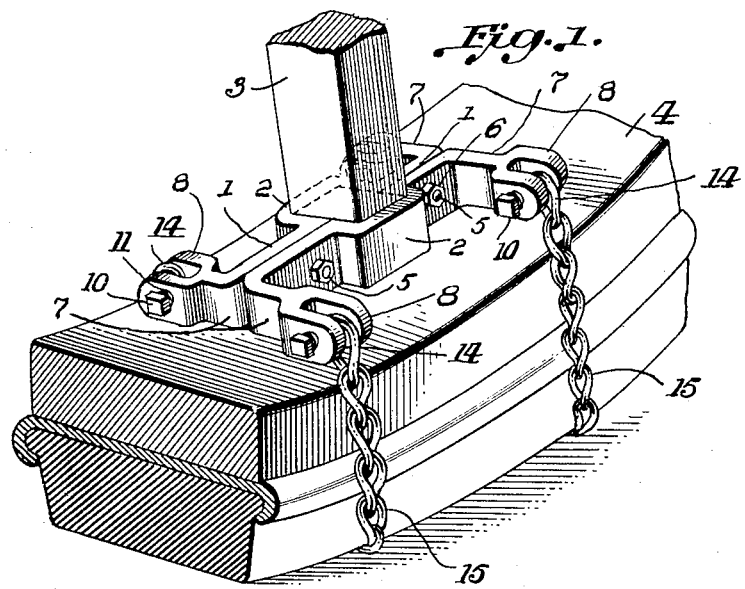
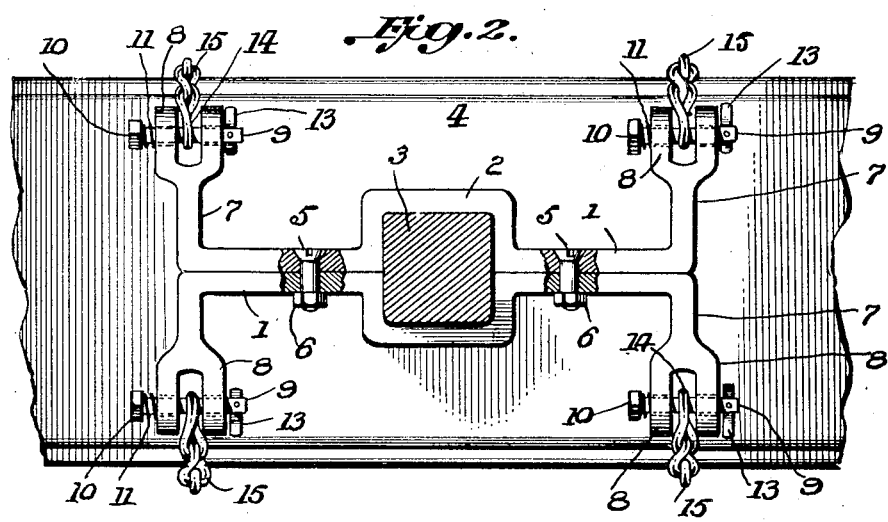
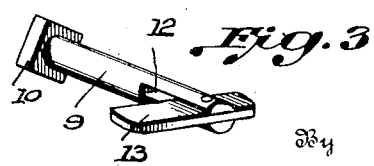
Edwin J. Canfield
Milton Morrill
Inventors
Attorneys

UNITED STATES PATENT OFFICE.

EDWIN J. CANFIELD AND MILTON MORRILL, OF DETROIT, MICHIGAN.

ANTISKIDDING DEVICE.

1,333,831.  Specification of Letters Patent.  Patented Mar. 16, 1920.

Application filed January 2, 1919. Serial No. 269,219.

*To all whom it may concern:*

Be it known that we, EDWIN J. CANFIELD and MILTON MORRILL, citizens of the United States of America, residing at Detroit, in the county of Wayne and State of Michigan, have invented certain new and useful Improvements in Antiskidding Devices, of which the following is a specification, reference being had therein to the accompanying drawings.

Our invention aims to provide an antiskidding device comprising a spoke unit that may be easily and quickly installed on a wheel spoke for supporting chains or tread members transversely of the tire of the wheel, so as to prevent the wheel from slipping or skidding on smooth surfaces or when traveling at a high rate of speed on a curved street or section of road. We have constructed the device so that it may be used as a fixture on the spoke with the chains or tread members detachably connected thereto, thus permitting of the chains or tread members being placed in active positions when street or road conditions necessitates the use of the same for safety purposes.

Our invention further resides in the simple, durable and inexpensive mechanical construction to be hereinafter described and reference will now be had to the drawing, wherein—

Figure 1 is a perspective view of a portion of a vehicle wheel provided with an anti-skidding device in accordance with our invention;

Fig. 2 is a view of the inner wall of a felly showing the device thereon partly broken away and partly in section;

Fig. 3 is a perspective view of one of the chain bolts of the device.

The anti-skidding device comprises two spoke clamping members 1 having spoke engaging or embracing portions 2 intermediate the ends thereof adapted to surround the spokes 3 and be held in engagement therewith, at the felly 4 of the wheel, by screw bolts 5 and nuts 6 or similar fastening means clamping the spoke members 1 together.

The outer ends of the spoke members 1 terminate in angularly disposed arms 7 with the arms of one spoke member in a transverse plane with the arms of the other spoke member, said arms extending toward the side edges of the felly 4. The outer ends of the arms 7 are forked or bifurcated to provide apertured ears or lugs 8.

Detachably mounted in the apertured ears or lugs 8 are longitudinally disposed chain holding bolts 9 having heads 10 and springs 11 encircling said bolts between the heads 10 and one of the apertured ears or lugs 8. The opposite end of each bolt is slotted, as at 12, and provided with a pivoted latch or cross member 13, which when in alinement with the bolt 9 permits of the bolt being inserted or removed relative to the apertured ears 8. The latch or cross member 13 can be swung at a right angle to the bolt to retain the bolt in engagement with the ears 8, and the spring 10 will prevent the bolt from accidentally shifting so that the latch or cross member 13 may aline therewith and become accidentally displaced. To aline the latch or cross member 13 with the bolt so that the bolt may be removed, it is necessary to press on the head 10 of the bolt and place the spring 11 under compression, thereby shifting the bolt to provide sufficient clearance for a swinging movement of the latch or cross member into the slot 12 of said bolt.

On the bolts of the anti-skidding device are the end links 14 of chains 15 and these chains are adapted to extend transversely of the tire or tread of the wheel.

With the end links of the chains held on the felly of the wheel, the chains cannot become accidentally displaced and are positively held in spaced relation with a view to preventing the wheel from sliding on slippery surfaces.

It is now apparent that a plurality of the spoke units may be used about the periphery of a wheel and as many devices installed as are necessary to accomplish a safety appliance for the wheel.

One embodiment of our invention has been illustrated but it is to be understood that the structural elements are susceptible to such changes as fall within the scope of the appended claims.

What we claim is:—

1. An anti-skidding device for wheels, comprising parallel spoke members adapted to be clamped in engagement with a spoke adjacent the felly of a wheel and disposed parallel to the side edges of the wheel felly, transversely alining arms carried by the outer ends of said spoke members and terminating in apertured ears in proximity to the side edges of the wheel felly, longitudinal bolts in the apertured ears of said arms, and chains having end links held by said bolts.

2. An anti-skidding device comprising parallel spoke members adapted to embrace a spoke and extend in a circumferential direction, means detachably connecting said members together, arms carried by the outer ends of said members and terminating in apertured ears, said arms being at a right angle to said members with the arms of one member in transverse alinement with the arms of the other member, bolts detachably mounted in the apertured ears of said arms, and sets of chains having end links held by said bolts.

In testimony whereof we affix our signatures in presence of two witnesses.

EDWIN J. CANFIELD.
MILTON MORRILL.

Witnesses:
 KARL H. BUTLER,
 ANNA M. DORR.